United States Patent
Winks

Patent Number: 6,099,430
Date of Patent: Aug. 8, 2000

[54] CLUTCHING ACTUATOR FOR CLUTCH CONTROL SYSTEM IN A DRIVE LINE APPARATUS

[75] Inventor: Joseph A. Winks, West Monroe, N.Y.

[73] Assignee: New Venture Gear, Inc., Troy, Mich.

[21] Appl. No.: 09/370,641

[22] Filed: Aug. 6, 1999

[51] Int. Cl.[7] .............................. F16D 67/02; F16H 57/00
[52] U.S. Cl. ........................... 475/204; 475/228; 74/425; 192/12 D
[58] Field of Search ................. 475/5, 204, 205, 475/228; 192/12 D; 74/425

[56] References Cited

U.S. PATENT DOCUMENTS

| | | | |
|---|---|---|---|
| 3,765,260 | 10/1973 | Lucas et al. | 74/424.8 R X |
| 4,527,458 | 7/1985 | Jonhson | 74/425 X |
| 4,650,056 | 3/1987 | Sevennec et al. | 74/89.14 X |
| 4,994,001 | 2/1991 | Wilkinson et al. | 475/5 |
| 5,054,335 | 10/1991 | Andrews . | |
| 5,170,674 | 12/1992 | Williams et al. . | |
| 5,323,871 | 6/1994 | Wilson et al. . | |
| 5,330,030 | 7/1994 | Eastman et al. . | |
| 5,346,442 | 9/1994 | Eastman . | |
| 5,363,938 | 11/1994 | Wilson et al. . | |
| 5,522,777 | 6/1996 | Baxter et al. . | |
| 5,582,263 | 12/1996 | Varma et al. . | |
| 5,620,077 | 4/1997 | Richard | 192/120 |
| 5,651,749 | 7/1997 | Wilson et al. . | |
| 5,655,618 | 8/1997 | Wilson et al. . | |
| 5,655,986 | 8/1997 | Wilson et al. . | |
| 5,678,673 | 10/1997 | Borschert et al. | 192/84.6 |
| 5,697,861 | 12/1997 | Wilson . | |
| 5,702,321 | 12/1997 | Bakowski et al. . | |
| 5,704,863 | 1/1998 | Zalewski et al. . | |
| 5,704,867 | 1/1998 | Bowen . | |
| 5,720,688 | 2/1998 | Wilson et al. . | |
| 5,788,008 | 8/1998 | Fort et al. . | |
| 5,853,342 | 12/1998 | Pritchard et al. . | |
| 5,878,624 | 3/1999 | Showalter et al. . | |
| 5,902,205 | 5/1999 | Williams . | |
| 5,911,644 | 6/1999 | Williams . | |
| 5,924,952 | 7/1999 | Bowen . | |
| 5,947,858 | 9/1999 | Williams . | |
| 5,951,429 | 9/1999 | Eastman . | |

FOREIGN PATENT DOCUMENTS

| | | | |
|---|---|---|---|
| 321335 | 6/1989 | European Pat. Off. | F16H 1/445 |

*Primary Examiner*—Khoi Q. Ta
*Attorney, Agent, or Firm*—Harness, Dickey & Pierce, P.L.C.

[57] ABSTRACT

A clutched actuator for use in a transfer case is disclosed which may be used in conjunction with electronic traction control systems and anti-lock braking systems where the clutched actuator system is required to quickly disengage the four-wheel drive of the vehicle. The clutched actuator is operably coupled to the transfer case of the vehicle drive system through a sector plate. The clutched actuator includes a worm drive motor assembly providing the base driving mechanism, a clutching mechanism, and a gear reduction mechanism for reducing the torque capacity required of the clutch mechanism. When the clutching mechanism is engaged, power is transmitted from the worm drive through the gear reduction mechanism to the output shaft to selectively engage the mode of operation of the transfer case, i.e., two-wheel or four-wheel drive mode, and the drive torque distribution between the front and rear wheels. The worm gear is non-backdrivable such that the motor need not provide a holding torque. When the clutching mechanism is disengaged, the worm drive is decoupled from the gear reduction mechanism for eliminating the holding torque and inertia associated with those components such that the energy stored in the transfer clutch can be quickly released.

12 Claims, 3 Drawing Sheets

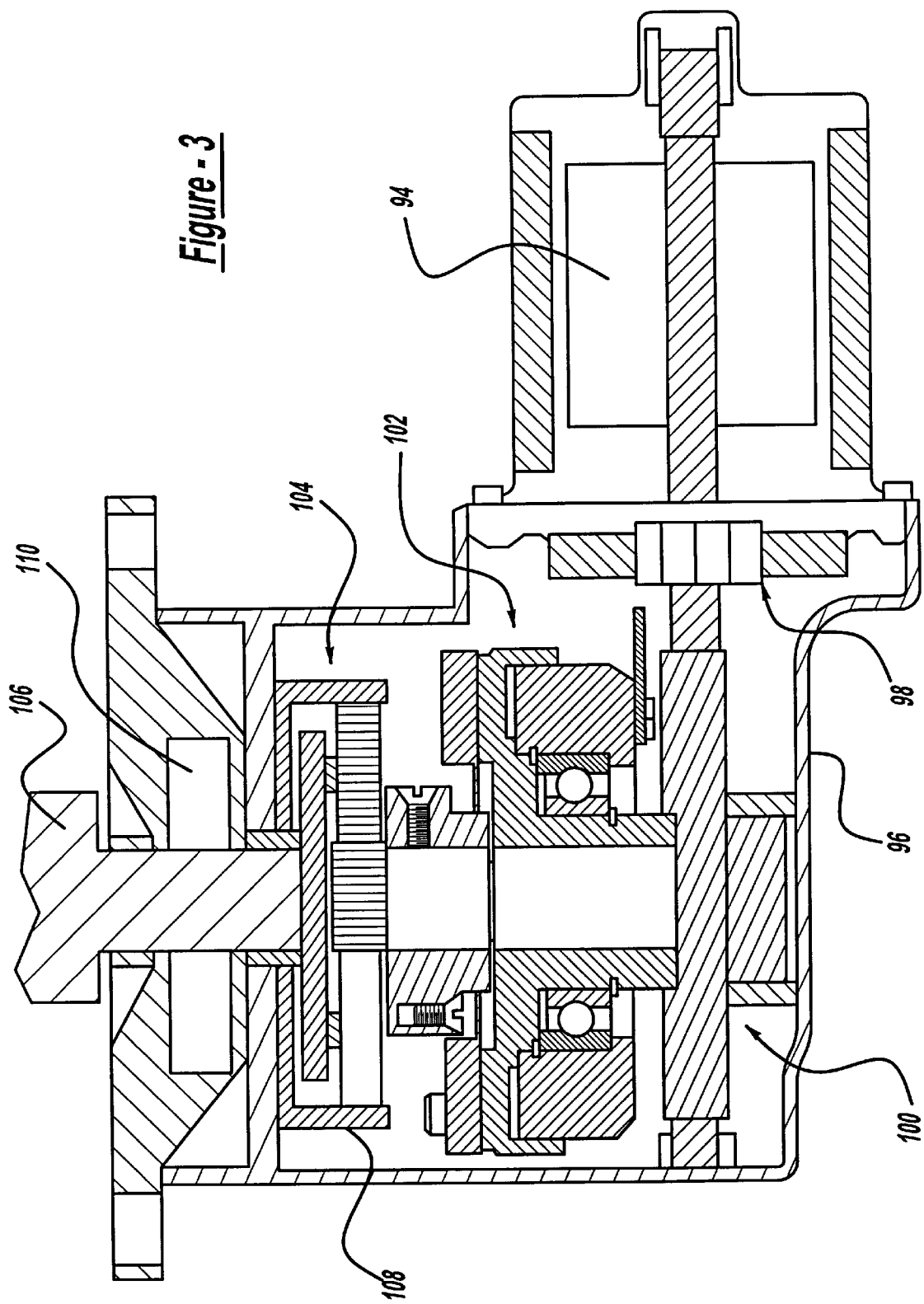

CLUTCHING ACTUATOR FOR CLUTCH CONTROL SYSTEM IN A DRIVE LINE APPARATUS

BACKGROUND OF THE INVENTION

The present invention relates generally to an actuator for a control system in a drive line apparatus, and more particularly to a clutching actuator for selectively controlling a component in a transfer case.

Many vehicles commonly drive either the front wheels or the rear wheels, which are powered by drive torque produced by the engine and distributed through the transmission. The drive train in many light duty trucks and sport utility vehicles includes a transfer case for transmitting drive torque from the engine and transmission to all four wheels, thereby establishing a four-wheel drive mode of operation. Drivers of these types of vehicles are provided with the option of selecting between two-wheel drive and four-wheel drive modes of operation. To accommodate differing road surfaces and conditions, many transfer cases are equipped with a gear reduction unit that can be selectively shifted by the vehicle's driver to further establish a four-wheel high-range and four-wheel low-range drive modes.

Early four-wheel drive vehicles required that the driver stop the vehicle, leave the vehicle and manually lock wheel hubs to engage the four-wheel drive mode. Current technology has evolved to allow the driver to engage four-wheel drive mode without leaving the cab of the vehicle. This can be accomplished through mechanical methods (i.e., a gearshift) or electronic methods (i.e., motor control). Furthermore, advanced controls allow electronic "on-the-fly" or "on-the-move" engagement of the four-wheel drive including selection between four-wheel high-range and low-range driving modes. Gear reduction units equipped with synchronizer clutches permit the vehicle's operator to shift from four-wheel low-range drive mode into four-wheel high-range drive mode without stopping the vehicle and alleviate the inconveniences of early systems. For example, U.S. Pat. No. 5,054,335 discloses a transfer case equipped with a synchronized range shift arrangement for "on-the-fly" shifting of a layshaft-type gear reduction unit. Alternatively, U.S. Pat. No. 5,346,442 discloses a transfer case having a synchronized range shift arrangement for "on-the-fly" shifting of a planetary-type gear reduction unit. In addition, U.S. Pat. No. 5,655,986 discloses a transfer case equipped with a planetary-type gear reduction unit that permits synchronized shifting between high-range drive mode and low-range drive mode. Pending U.S. patent application Ser. No. 09/237,179 discloses a transfer case shift control system using an automatic shutdown relay circuit for on the move shifting between high-range and low-range drive modes. U.S. Pat. No. 5,346,442 and pending application Ser. No. 09/237,179 are commonly assigned to the assignee of the present invention and their disclosures are hereby expressly incorporated by reference herein.

In addition to the above-noted mechanically synchronized range shift system, it is also known to electronically control the drive train to provide "on-the-fly" range .shifting of transfer cases. For example, an electronically shifted two-speed transfer case is disclosed in U.S. Pat. No. 5,522,777 as having a transfer case control module which receives input signals from the engine control module relating to the current transmission gear, engine speed and vehicle speed. The transfer case control module uses these input signals to generate control signals that feed back to the engine control module for use in regulating the vehicle's operation and to accommodate "on-the-fly" shifting. Specifically, the engine control module will control the engine's fuel system to modify the engine speed and/or shift the transmission gear to match the rotary speed of the transmission output with that of the transfer case output prior to actuation of the range shift mechanism.

Four-wheel drive vehicles may also employ electronic traction control systems which aid the driver in maintaining vehicle control under a wide range of terrain and driving conditions by selectively controlling the distribution of torque between the front and rear wheels through the use of a clutch assembly. Under moderate, normal driving conditions it is not desirable to use full-time four-wheel drive in a vehicle; however, changing road conditions and weather conditions make selective engagement of four-wheel drive advantageous to maintain proper control of the vehicle and to provide additional traction. Traction control systems, in part, work by sensing the speed differential between both axles. If an excessive difference exists, the torque distribution is modified to provide additional traction and control to a particular axle and thus the front or rear wheels. When the speed differential drops and the extra traction and control is no longer needed, the four-wheel drive automatically disengages and the vehicle returns to two-wheel drive. These systems have gained popularity, in part, due to their versatility and programmability.

Many vehicles now include anti-lock braking systems (ABS) require integration with electronic traction control systems. Anti-lock braking systems sense the speed and traction of each wheel during braking and apply a braking algorithm to maintain control and traction of the vehicle and to prevent skidding. An ABS algorithm may vary the braking force on the wheels individually. It is not desirable to have the front and rear drive lines mechanically connected when braking a single wheel or drive line since the mechanical connection would impede the effectiveness of the braking control by allowing the braking mechanism on one wheel to have a greater effect on the other wheels. To effectively control braking in anti-lock braking systems, traction control systems must be able to quickly disengage from the four-wheel drive mode of operation in order to allow for ABS yaw control and optimum ABS braking performance. Therefore, the response time of the clutch assembly must be sufficient fast to be compatible with ABS algorithms that require quick disengagement.

Current clutch control systems, in addition to having insufficient response times, use motors to engage and disengage the clutch assembly that require high torque and, therefore, also draw high currents. These currents can be in the tens of amps range. Because of the high currents produced by the pulse width modulation (PWM) motors used, the current systems produce substantial electromagnetic interference (EMI). EMI can adversely affect the vehicle's various electrical systems, especially adjacent systems. Many countries strictly regulate EMI, and, therefore, another a strong need exists to reduce EMI emissions from their present levels.

Current actuator system selectively engage the four-wheel drive systems through the bidirectional operation of a drive motor. The four-wheel drive mode is engaged by driving a motor to move a sector shaft in one direction. The four-wheel drive mode is disengaged by driving the motor in the reverse direction and, therefore, reversing the motion of the sector shaft. Current system response times, are limited in part, by the time it takes to reverse the motor. The motors in current actuator systems cannot reverse fast enough to meet the demands of the new traction control systems. In addition to the performance limitations, the reversal of motors causes substantial EMI and current draws. Therefore, a need exists to increase the response times of current actuator systems.

In view of the substantial interest in "on-the-fly" transfer case actuator systems, a recognized need exists to develop an actuator system for four-wheel drive vehicles equipped with ABS systems and electronic traction control systems to further advance the current technology.

SUMMARY OF THE INVENTION

Accordingly, an object of the present invention is to provide an actuator for a control system in a drive line apparatus.

The present invention is generally directed toward four wheel drive vehicles using electronic traction control systems. It has further applications to four wheel drive vehicles using electronic traction control systems and anti-lock braking systems (ABS).

A preferred embodiment of the present invention includes a motor assembly having a worm drive as the base driving mechanism. A clutching system is operably coupled to the motor assembly. The clutch is a power-on clutch; its default, power-off position is disengaged. A gear reduction system, such as the planetary gear assembly, is operably coupled to the clutching system and is used to reduce the torque capacity requirements of the clutch. When the clutch is engaged, power is transmitted from the worm drive through the clutch and the gear reduction system to the output shaft. When the clutch is disengaged, the worm drive mechanism is decoupled from the gear reduction system, eliminating the holding torque and inertia associated with those components. When the clutch is released, the energy stored in the transfer case clutch system quickly dissipates through the low inertia and drag of the actuator gear reduction system.

In the present invention, it is possible to separate the actuator clutching system design from the worm drive actuator. Additionally, it is possible to use a two-stage reduction system to further reduce the size and power consumption of the clutch system.

The present invention may also incorporate a braking device operably coupled to the gear reduction system, thereby eliminating the clutching device and reducing the overall packaging size of the actuator assembly. When the annulus gear is held, power flows from the worm drive through the planetary reduction to the output shaft. When the annulus gear is free to spin, the output shaft is also free to spin relative to the worm drive allowing the energy stored in the transfer case clutch system to be released through the annulus gear.

The present invention allows clutch disengagement in less than 50 milliseconds.

The present invention eliminates the need for a separate holding mechanism through the use of a non-backdrivable worm drive.

The present invention eliminates the need for expensive, high efficiency bearings in the gear train.

The present invention allows for the use of a standard, low-cost motor assembly.

The present invention may significantly reduce the EMI produced by the clutched actuator system.

The above objects and other objects, features and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 3 is a sectional view of the clutch actuator system.

DETAILED DESCRIPTION OF THE PREFERRED EMBODIMENTS

Figure 1:
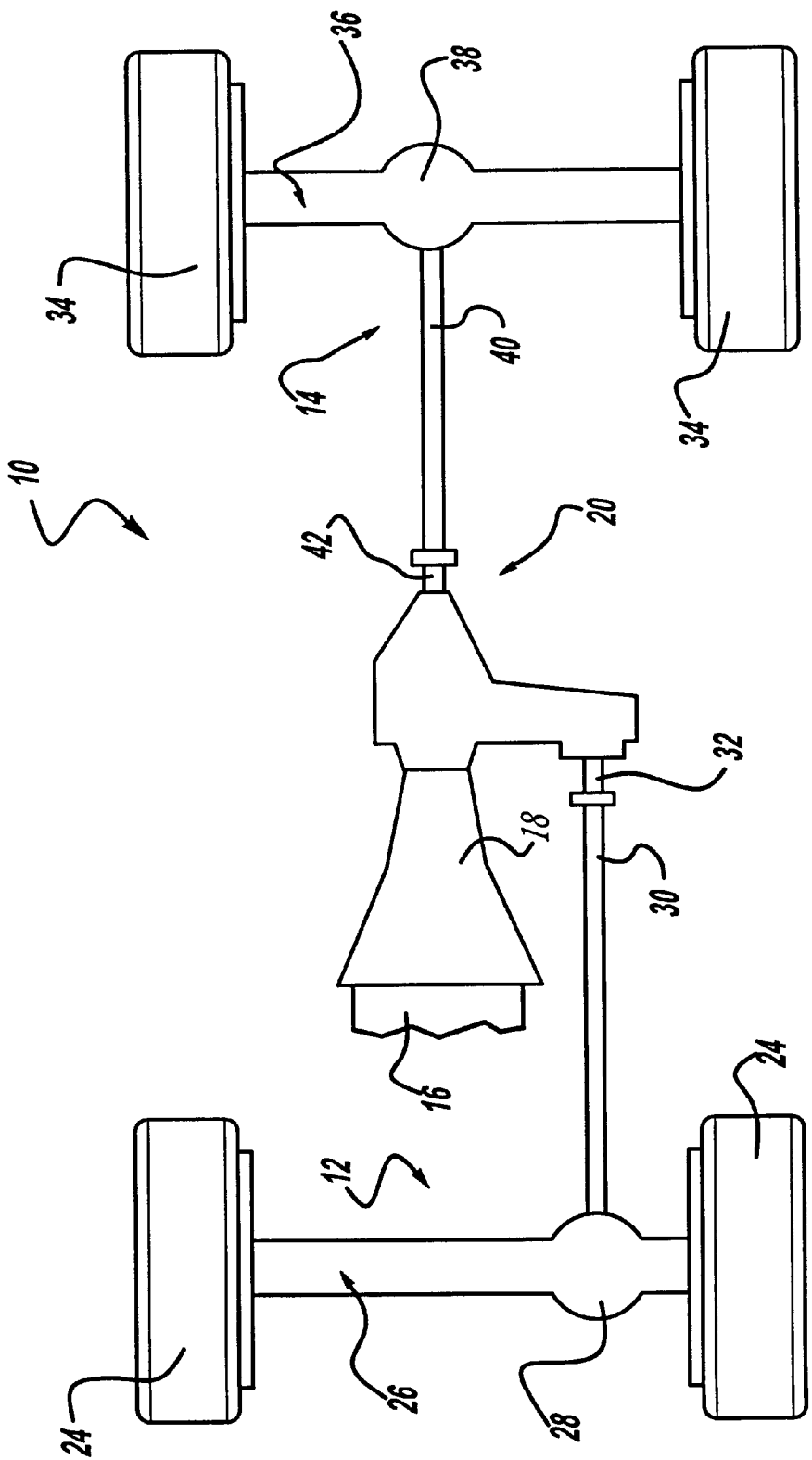
FIG. 1 illustrates the drive train of a four-wheel drive motor vehicle equipped with the clutch actuator control system of the present invention.

With particular reference to FIG. 1 of the drawings, a motor vehicle drive train 10 for a four-wheel drive vehicle is schematically shown. The drive train 10 includes a front drive line 12 and a rear drive line 14 that are both drivable from a source of power, such as an engine 16, through a transmission 18. The transmission 18 may be of either the manual or automatic type. In the particular embodiment shown, the drive train 10 is a four-wheel drive system which incorporates a transfer case 20 for selectively transmitting drive torque from the engine 16 and transmission 18 to the front drive line 12 and rear drive line 14. The front drive line 12 is shown to include a pair of front wheels 24 connected at opposite ends of a front axle assembly 26 having a front differential 28 that is coupled to one end of a front drive shaft 30, the opposite end of which is coupled to front output shaft 32 of transfer case 20. Similarly, the rear drive line 14 includes a pair of rear wheels 34 connected at opposite ends of a rear axle assembly 36 having a rear differential 38 coupled to one end of a rear drive shaft 40, the opposite end of which is interconnected to a rear output shaft 42 of transfer case 20.

In the particular embodiment shown, the drive train 10 is a rear-wheel drive system. The engine 16 provides drive torque that is distributed through the transmission 18 for driving the rear wheels 34. This mode defines a two-wheel drive mode. The transfer case 20 is part-time in that the transfer case 20 can be controlled to transfer drive torque to the front wheels 24, in addition to the rear wheels 34. This mode defines part-time a four-wheel drive mode. One skilled in the art will recognize that the orientation of the drive train 10 is merely exemplary in nature, and the drive train 10 can be reversed to drive the front wheels 24 in two-wheel drive mode and additionally engage the rear wheels 34 in four-wheel drive mode.

Figure 2:
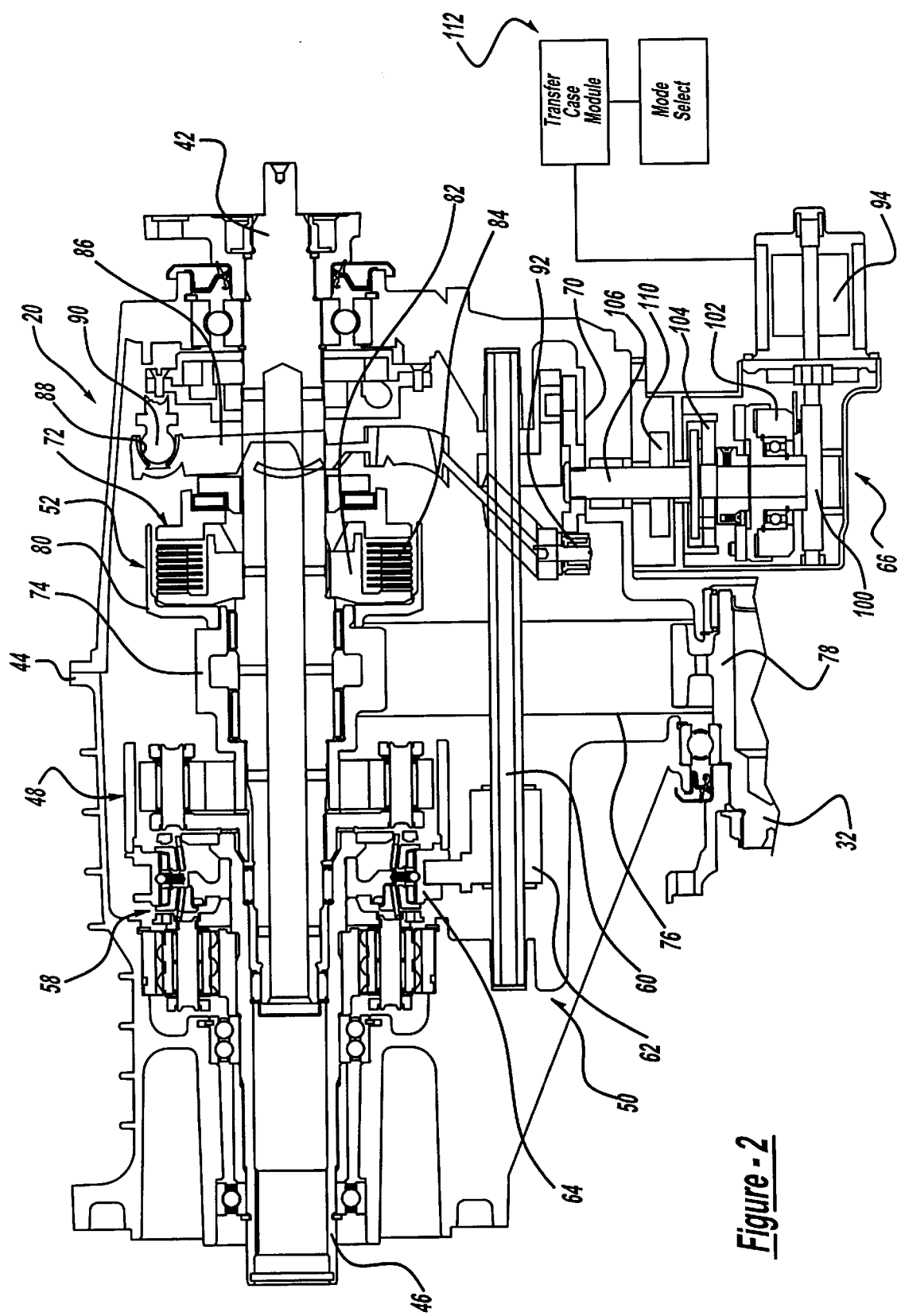
FIG. 2 is a sectional view of a transfer case equipped with the clutch actuator.

With reference to FIG. 2, the transfer case 20 is shown to include a housing 44 and an input shaft 46 rotatably supported from the housing 44. The input shaft 46 is adapted to be connected to an output shaft (not shown) of the transmission 18 such that both are rotatably driven by the engine 16 of the motor vehicle. As seen, the rear output shaft or main shaft 42 is rotatably supported between the input shaft 46 and the housing 44, and the front output shaft 32 is rotatably supported from the housing 44. The transfer case 20 is equipped with a power transfer mechanism whose parts include a planetary gearset 48, a synchronized range shift mechanism 50 and a drive assembly 52. The planetary gearset 48 functions as a two-speed gear reduction unit which, in conjunction with a range clutch 58 of the synchronized range shift mechanism 50, operates to establish the drive connection between the input shaft 46 and the main shaft 42 in either a two-wheel drive mode, a neutral drive mode, a four-wheel high drive mode or a four-wheel low drive mode.

The range shift mechanism 50 includes a range fork 62 coupled to a range sleeve 64 which selectively establishes the drive condition. A clutched actuator 66 is secured to the transfer case and functions to axially drive rail 60 for selectively positioning the range fork 62. More specifically, clutched actuator 66 includes a sector plate 70 operably coupled thereto so as to be rotatably drivable through a range of angular motion by an output shaft 68. Sector plate 70 is operably coupled to rail 60 for controlling the axial position thereof.

According to a preferred embodiment of transfer case 20, the drive assembly 52 includes a transfer clutch 72 that is operable for selectively transferring drive torque from main shaft 42 to front output shaft 32, thereby delivering drive torque to front wheels 12 when transfer case 20 is in a four-wheel drive mode. More specifically, a drive sprocket 74 is rotatably supported by one or more bearing assemblies on main shaft 42. Drive sprocket 74 drivingly engages a chain 76 which is coupled to a driven socket 78. Driven socket 78 is coupled to, or an integral portion of front output shaft 32.

Transfer clutch 72 is a mechanically actuated multi-plate clutch assembly that is arranged to concentrically surround a central portion of main shaft 42. Rotatable drum assembly 80 concentrically surrounds clutch hub 82 which is fixed (i.e., splined) to main shaft 42 for rotation therewith. Thus, drum assembly 80 and clutch hub 82 are capable of rotating relative to one another. Disposed therebetween are two sets of alternately interleaved friction clutch plates 84 that are operable for transferring torque from main shaft 42 and clutch hub 82 to drum assembly 80 which rotates drive sprocket 74 in response to a clutch engagement force applied thereto.

A reaction lever 86 acts as a pressure plate for compressing the interleaved clutch plates 84 so as to cause drive torque to be transferred through transfer clutch 72 as a function of the clutch engagement force exerted thereon. The reaction lever 86 has a cup 88 formed at one end which is adapted to receive a ball 90 for pivotally coupling reaction lever 86 to housing 44. A roller assembly 92 disposed on an end of reaction lever 86 opposite cup 88 is operably coupled to the sector plate 70 of clutched actuator 66. Clutched actuator 66 is operably coupled to reaction lever 86 through sector plate 70 which controls the magnitude of the clutch engagement force exerted on clutch plates 84. Further description of the configuration, interconnection and operation of the range shift mechanism 60 and the transfer clutch 72 by the sector plate 70 is set forth in U.S. Pat. Nos. 5,330,030, 5,363,938 and 5,411,110. These patents are commonly owned by the assignee of the present invention, the disclosures of which are expressly incorporated by reference herein.

With reference to FIGS. 2 and 3, the clutched actuator 66 includes a motor 94 attached to a housing 96 of the clutched actuator 66. Preferably, the motor 94 is a permanent magnet DC motor with a maximum rating of 45 in-oz. Internally, the motor 94 is operably coupled to a motor gear assembly 98. The motor gear assembly 96 is further connected to a worm drive reduction assembly 100. The worm drive reduction assembly 100 is preferably a one-way gear assembly (i.e., cannot be backdriven) having a reduction ratio in the range of 40:1–50:1 with 110 in-lb of torque capacity. An electromagnetic clutching system 102 connects to a gear reduction mechanism 104 and to the worm drive 100. The clutching system 102 may utilize a friction disc or dog clutch mechanism with approximately 125–140 in-lb of static holding torque. Control of clutched actuator 66 is provided by modulation of the current applied to clutching system 102 which is significantly less than the current applied to motor 94. As such, the EMI resulting from the control of clutched actuator 66 is significantly reduced. The gear reduction mechanism 104 may utilize a planetary gear assembly or traditional gearset. The gear reduction mechanism 104 is approximately 5.5:1. Assuming 75% efficiency at 20 RPM, the torque output shaft 106 will produce approximately 502 lb-in of torque. Output shaft 106 is operably coupled to sector plate 70.

When the clutching system 102 is engaged, the torque generated by motor 94 is transmitted through the worm drive 100, the clutching system 102 and the gear reduction system 104 to the output shaft 106. Holding torque is provided by the worm drive assembly 100 which cannot be backdriven. When the clutching system 102 is disengaged, the worm drive mechanism 100 is decoupled from the gear reduction mechanism 104 and the output shaft 106 such that the holding torque and inertia associated with the motor 94 is eliminated. The energy stored in the transfer clutch 72 is quickly released through the low inertia and drag of the actuator gear reduction mechanism 104. Furthermore, by separating the actuator clutching system 102 from the worm drive actuator 100, standard, low-cost worm drive actuators may be utilized.

The operation of clutched actuator 66 will now be described. When the motor 94 is driven in a first direction, the output shaft 106 rotates and drives a sector plate 70 in one direction to a predetermined position based on a desired mode of operation. The sector shaft 142 is held in position due to the holding force provided by the non-backdrivable worm drive 100. The output shaft 106 can be further driven in the same direction by continuing to drive the motor 94 and rotate the sector plate 70. To drive the sector plate 70 in a second direction (opposite the first direction) clutching system 102 uncouples the worm drive 100 from the gear reduction mechanism 104. The worm drive 100 is then no longer connected to the gear reduction mechanism 104 and, therefore, provides no holding power. The holding power of the clutched actuator 66 is dissipated thorough the low inertia of the gear reduction mechanism 104 which causes the output shaft 106 along with sector plate 70 to rotate in the opposite direction. Thus, to reverse the direction of movement of the sector shaft 100, it is not necessary to reverse the direction of operation of the motor 94. The reversal of the motion of sector plate 70 and the resulting transfer case drive mode change, due to the rapid power dissipation in the gear reduction mechanism 104 and the resulting movement of the sector plate 70, occurs rapidly because the time delay associated with reversing a motor and actively driving the system in the second direction is not required. Using a motor to drive the system in only one direction eliminates the high frequency reversal of the motor present in previous designs, thereby allowing for faster response times when reversing the motion of the sector plate 70.

In an alternate embodiment, the de-coupling function performed by clutching system 102 could be performed by a braking device (not shown). More specifically, the braking device is operably disposed between housing 44 and the annulus gear 108 of the planetary reduction system 104 which eliminates the need for clutching system 102, thereby reducing the packaging requirements for the present invention. In operation, when the annulus gear 108 is held, power would flow from the worm drive 100 to the planetary reduction system 104 to the output shaft 106. When the annulus gear 108 is free to spin, the output shaft 106 is also free to spin relative to the worm drive 100. This allows the energy stored in the transfer case clutch system to be released through the annulus gear 108.

An electrical positioning or encoding device 110 can be connected to the torque output shaft 106. The electrical positioning or encoding device 110 monitors the position of the output shaft 106 to determine the position of the sector plate 70 and, therefore, the drive mode of transfer case 20. The electrical positioning device 110 can be used by a control system 112 which controls the selective engagement and disengagement of all the various two-wheel and four-wheel drive modes of the vehicle.

It will be appreciated that the clutched actuator of the present invention represents a significant improvement over the art. While a preferred embodiment of this invention has been disclosed herein, it should be further appreciated that modifications may be made without departing from the scope of the present invention. In addition, while various components have been described in an exemplary fashion, various other components may, of course, be employed. It is intended by the following claims to cover these and other departures from the disclosed embodiment which fall within the true spirit of this invention.

I claim:

1. A clutched actuator comprising:

a motor;

a base driving mechanism having a drive shaft operable for receiving a drive torque from the motor and further operable for generating a holding torque when back-driven;

a clutching mechanism having a first shaft operably coupled to the drive shaft and a second shaft selectively engagable to the first shaft through a clutch member; and a gear reduction mechanism having an input shaft operably coupled to the second shaft and an output shaft operably connected to the input shaft.

2. The system of claim 1 that further comprises an electronic positioning device operably connected to the output shaft.

3. The system of claim 1 where the motor is operably coupled to the base driving mechanism through a gear assembly.

4. The system of claim 1 where the base driving mechanism is a worm gear drive.

5. The system of claim 1 where the clutching system is an electromagnetic clutch.

6. The system of claim 1 where the gear reduction system utilizes a planetary gearset.

7. The system of claim 1 where in the default, power-off position of the system the worm drive mechanism is decoupled from the gear reduction system.

8. The system of claim 1 where the clutching system is separated from the base driving mechanism.

9. The system of claim 1 where the gear reduction system uses at least two stages.

10. A drive line system for a motor vehicle of the type selectable between a two-wheel drive mode and a four-wheel drive mode, the system comprising:

a transfer case having an input shaft adapted to receive drive torque from a transmission, a gear assembly operably coupled to the input shaft, a first output shaft operably coupled to the gear assembly, a second output shaft, and a torque transfer mechanism operable to selectively couple the gear assembly to the second output shaft; and an actuator mechanism operably connected to the transfer case for selectively coupling the gear assembly to the second output shaft, the actuator mechanism including a base driving mechanism having a drive shaft, a clutching mechanism having a drive member operably coupled to the drive shaft and a driven member selectively connected to the drive member through a clutch member, a gear reduction mechanism having an input shaft operably coupled to the driven member and an output shaft operably connected to the input shaft through a gear assembly, the output shaft of the gear reduction mechanism operably connected to the torque transfer mechanism for selectively coupling the gear assembly to the second output shaft.

11. A method of selectively engaging four-wheel drive in a motor vehicle comprising the steps of:

providing drive torque to a base driving mechanism;

increasing the torque capacity of the base driving mechanism through a gear reduction mechanism;

selectively coupling the base driving mechanism with the gear reduction mechanism through a clutching system;

controlling the four-wheel drive mode of the vehicle through a output shaft operably connected to the gear reduction mechanism.

12. The method of claim 11 further comprising the step of:

monitoring the operation of the output shaft through an electrical positioning device; and controlling the four-wheel drive mode of the vehicle based on the position of the output shaft.

* * * * *